(12) United States Patent  (10) Patent No.: US 7,625,164 B2
Rode  (45) Date of Patent: Dec. 1, 2009

(54) LOCK NUT SYSTEM

(76) Inventor: John E. Rode, Persee Rd., P.O. Box 1127, Fonda, NY (US) 12068

( * ) Notice: Subject to any disclaimer, the term of this patent is extended or adjusted under 35 U.S.C. 154(b) by 125 days.

(21) Appl. No.: 11/738,041

(22) Filed: Apr. 20, 2007

(65) Prior Publication Data

US 2007/0286699 A1  Dec. 13, 2007

Related U.S. Application Data

(63) Continuation of application No. 11/029,531, filed on Jan. 5, 2005, now Pat. No. 7,303,367.

(51) Int. Cl.
F16B 39/22 (2006.01)
(52) U.S. Cl. .................. 411/246; 411/190; 411/204
(58) Field of Classification Search .................. 411/530, 411/516, 520, 521, 221, 237, 926, 247–250, 411/301–303, 246, 190
See application file for complete search history.

(56) References Cited

U.S. PATENT DOCUMENTS

| | | | | |
|---|---|---|---|---|
| 578,276 A | * | 3/1897 | Strauss | |
| 1,352,643 A | * | 9/1920 | Young | |
| 1,366,273 A | * | 1/1921 | Nettlefold | 411/250 |
| 1,373,489 A | * | 4/1921 | Royal Cochran | 411/246 |
| 1,440,938 A | * | 1/1923 | Sieroslawski | |
| 1,755,807 A | * | 4/1930 | Boles | |
| 1,758,515 A | * | 5/1930 | Heiermann | |
| 2,301,786 A | * | 11/1942 | Millermaster | 174/51 |
| 2,426,219 A | * | 8/1947 | Jackson | 287/53 |
| 2,755,698 A | * | 7/1956 | Wurzel | 85/8.8 |
| 2,813,732 A | * | 11/1957 | Hird | 287/53 |
| 3,144,909 A | * | 8/1964 | Hart et. al. | 403/355 |
| 3,464,474 A | * | 9/1969 | Jansen | 411/216 |
| 3,480,300 A | * | 11/1969 | Jeffery et al. | 285/93 |
| 3,581,609 A | * | 6/1971 | Greenwood | 81/124.7 |
| 3,678,981 A | * | 7/1972 | Heyworth | 411/108 |
| 3,762,455 A | * | 10/1973 | Anderson Jr. | 151/28 |
| 3,844,323 A | * | 10/1974 | Anderson Jr. | 151/28 |
| 3,986,750 A | * | 10/1976 | Trent et al. | 301/9 |
| 4,048,897 A | * | 9/1977 | Price, Jr. | 411/433 |
| 4,812,094 A | * | 3/1989 | Grube | 411/134 |

(Continued)

OTHER PUBLICATIONS

STEMCO —PRO-TORQ Advanced Axle Spindle Nuts, Installation Procedure and Wheel Bearing Adjustment.*

(Continued)

*Primary Examiner*—Victor Batson
*Assistant Examiner*—Roberta Delisle
(74) *Attorney, Agent, or Firm*—Heslin Rothenberg Farley & Mesiti P.C.; Nicholas Mesiti, Esq.; Victor A. Cardona, Esq.

(57) ABSTRACT

A lock nut system includes a molded nut having a plurality of teeth and a molded keeper having a plurality of keeper teeth engageable with the plurality of teeth to inhibit movement of the keeper relative to the nut when the plurality of teeth engages the plurality of keeper teeth. The keeper has a radially inner side configured to engage a shaft to inhibit rotational movement of the nut relative to the shaft when the plurality of teeth engages the plurality of keeper teeth.

25 Claims, 9 Drawing Sheets

U.S. PATENT DOCUMENTS

| | | | | |
|---|---|---|---|---|
| 4,971,501 A * | 11/1990 | Chavez | | 411/221 |
| 5,180,265 A * | 1/1993 | Wiese | | 411/150 |
| 5,348,349 A * | 9/1994 | Sloane | | 285/92 |
| 5,362,111 A * | 11/1994 | Harbin | | 285/92 |
| 5,533,849 A * | 7/1996 | Burdick | | 411/120 |
| 5,597,058 A * | 1/1997 | Ewer | | 192/69.43 |
| 5,882,044 A * | 3/1999 | Sloane | | 285/92 |
| 6,065,920 A * | 5/2000 | Becker et al. | | 411/518 |
| 6,520,710 B2 * | 2/2003 | Wells | | 403/344 |
| 6,749,386 B2 * | 6/2004 | Harris | | 411/544 |
| 6,857,665 B2 * | 2/2005 | Vyse et al. | | 285/92 |
| 6,976,817 B1 * | 12/2005 | Grainger | | 411/204 |
| 2002/0110414 A1 * | 8/2002 | Wells | | 403/344 |
| 2003/0035699 A1 * | 2/2003 | Harris | | 411/161 |
| 2004/0086354 A1 * | 5/2004 | Harris | | 411/161 |
| 2005/0025604 A1 * | 2/2005 | Slesinski et al. | | 411/112 |
| 2005/0207865 A1 * | 9/2005 | Disantis et al. | | 411/160 |
| 2006/0008340 A1 * | 1/2006 | Cox | | 411/248 |

OTHER PUBLICATIONS

Stemco, Quick Reference Catalog 572-0011 Rev. Jul. 2003; revised Jul. 2003; downloaded from http://www.stemco.com/Portals/0/Catalog/572-0011_Quick_Reference_07.2003.pdf, pp. 38-41.*

Stemco, Wheel End Products Catalog 574-0140, Revised Mar. 2003; downloaded from http://www.stemco.com/stemco/Portals/0/Catalog/574-0140_Wheel_End_Catalog_03.2003.pdf, pp. 57-64.*

* cited by examiner

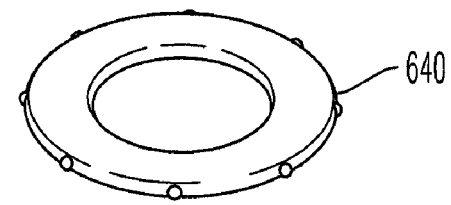
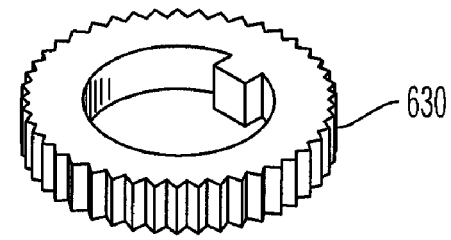
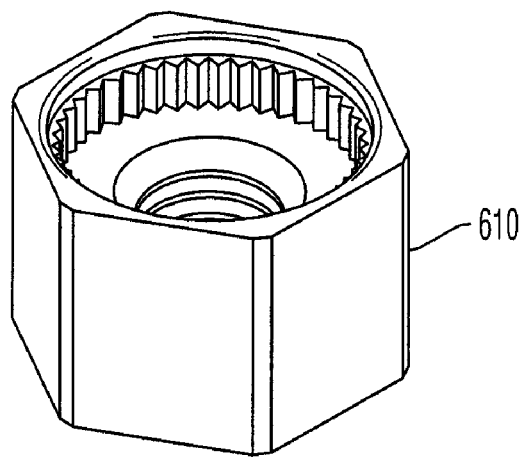
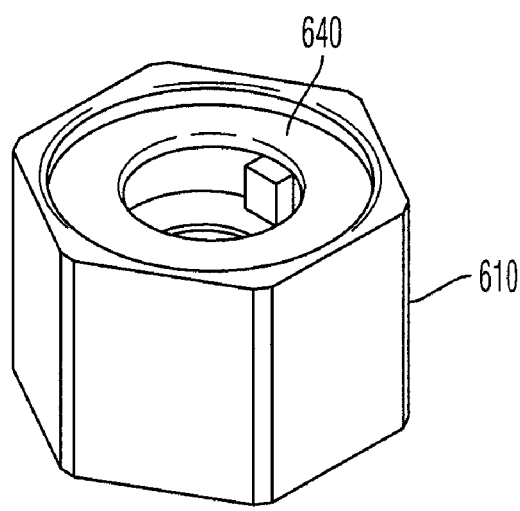
Fig. 12        Fig. 13

LOCK NUT SYSTEM

CROSS-REFERENCE TO RELATED APPLICATIONS

This application is a continuation of U.S. patent application Ser. No. 11/029,531, filed Jan. 5, 2005, the entire disclosure of which is incorporated herein by reference.

TECHNICAL FIELD

This invention relates, generally, to fasteners, and more particularly, to lock nuts for inhibiting rotation of shafts engaged with such nuts.

BACKGROUND ART

Lock nut systems are often connected to shafts and utilized to inhibit rotation of the retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft. Such locking members are often made of stamped sheet metal.

Also, the engagement between a locking member and a shaft may have play in it such that movement is possible. Such movement may cause damage to the shaft thereby complicating or preventing removal and reattachment of the nut to the shaft. In particular, at moderate torques, such locking members may dig into the shaft (e.g., threads of the shaft) thereby damaging the shaft. For example, the locking member engagement may create a bur on the shaft. Such damage to the shaft, particularly those made of stamped sheet metal, can cause damage to the threads of the nut as the nut is removed from the shaft and/or re-engaged therewith. The digging in of such locking member to a shaft can therefore lead to stripping of the threads of the nut and/or locking member thereby making proper engagement of the threads of the shaft with the threads of the locking member and/or nut difficult or impossible or lead to failure of the retention system.

Thus, a need exists for lock nut systems which inhibit movement of shafts relative to retaining nuts and which are configured to inhibit damage to lock nut systems and the shafts engageable therewith.

SUMMARY OF THE INVENTION

The present invention provides, in a first aspect, a lock nut system which includes a molded nut having a plurality of engaging teeth. A molded keeper having a plurality of keeper teeth is engageable with the plurality of teeth of the nut to inhibit movement of the keeper relative to the nut when the plurality of engaging teeth engages the keeper teeth. The keeper has a radially inner side configured to engage a shaft to inhibit rotational movement of the shaft relative to the nut when the plurality of teeth engages the plurality of keeper teeth.

The present invention provides, in a second aspect, a lock nut system which includes a nut having a plurality of engaging teeth, a slot, and an outer surface axially closest to the slot. The slot is located axially between the plurality of engaging teeth and the outer surface. A keeper includes a plurality of keeper teeth engageable with the plurality of engaging teeth to inhibit movement of the keeper relative to the nut when the plurality of engaging teeth engages with the plurality of keeper teeth. A keeper retaining member is connected to the keeper and the keeper retaining member includes at least one leg configured to be received in the slot. The keeper retaining member is configured to hold the keeper axially such that the plurality of teeth and the plurality of keeper teeth are engaged when the at least one leg is received in the slot. The keeper includes a radially inner side configured to engage a shaft to inhibit rotational movement of the nut relative to the shaft when the plurality of teeth engages the plurality of keeper teeth and the radially inner side engages the shaft.

The present invention provides, in a third aspect, a lock nut system which includes a nut having a plurality of engaging teeth, an outer surface axially closest to the plurality of engaging teeth, and a shoulder. A keeper includes a plurality of keeper teeth engaging the plurality of engaging teeth to inhibit movement of the keeper relative to the nut when the plurality of engaging teeth engages the plurality of keeper teeth. The shoulder is substantially orthogonal to an axis of the nut and abuts and axially supports the keeper. The keeper includes a radially inner side configured to engage a shaft to inhibit rotational movement of the nut relative to the shaft when the plurality of engaging teeth engages the plurality of keeper teeth and the radially inner side engages the shaft.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be readily understood from the following detailed description of preferred embodiments taken in conjunction with the accompanying drawings in which:

FIG. 12 is a perspective exploded view of the system of FIG. 11 shown with the keeper retaining member and the keeper separated from the nut; and FIG. 13 is a perspective view of the system of FIG. 11 showing the keeper and keeper retaining member engaged with the nut.

DETAILED DESCRIPTION

Figure 1:
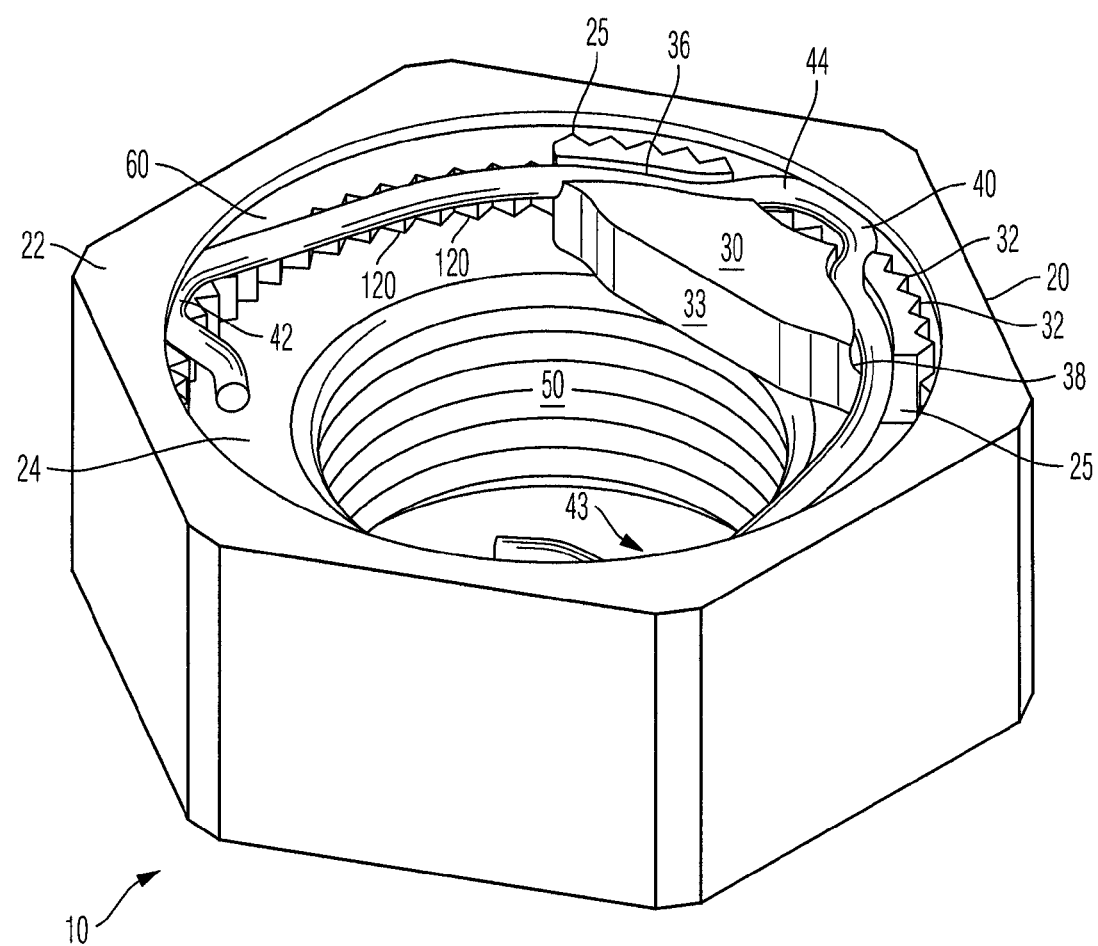
FIG. 1 is a perspective view of a lock nut system which includes a lock nut having a keeper and a keeper retaining member engaged with the nut.
Figure 2:
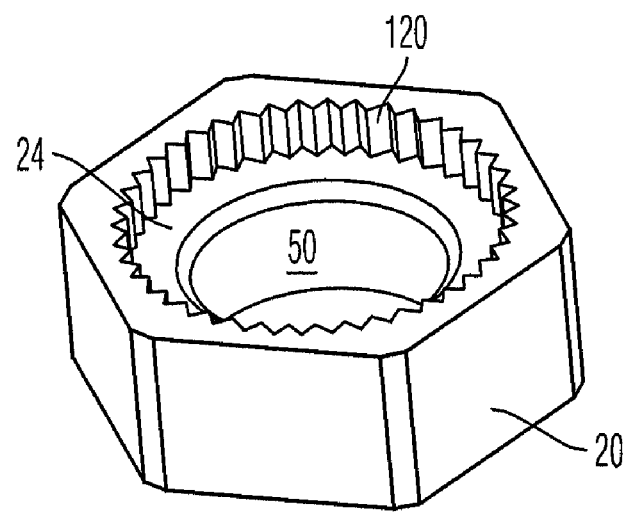
FIG. 2 is a perspective view of the lock nut of the lock nut system of FIG. 1.
Figure 3:
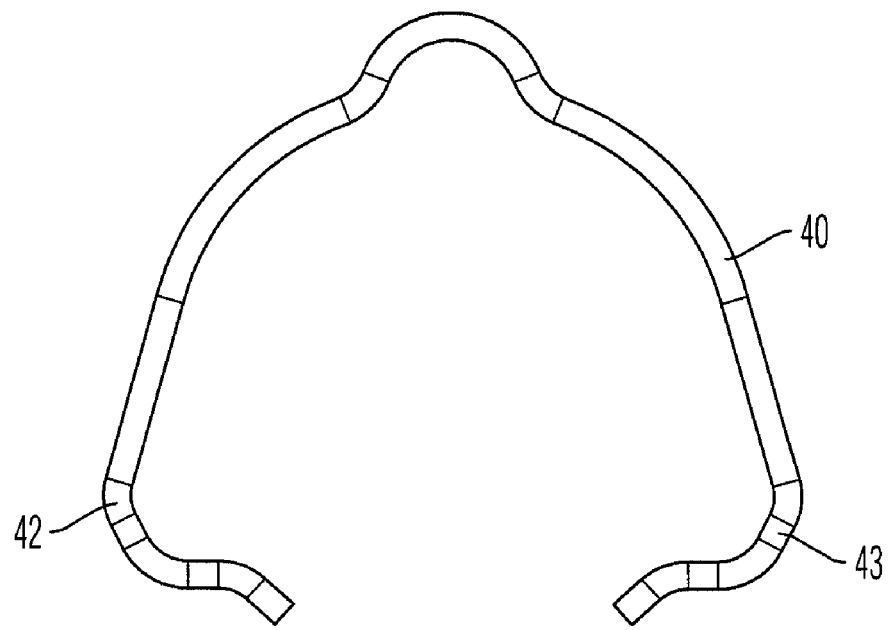
FIG. 3 is a side elevational view of the keeper retaining member of FIG. 1.

In accordance with the principles of the present invention, a lock nut system engageable with a shaft is provided.

In an exemplary embodiment, a lock nut system 10 includes a nut 20, a key or keeper 30 and a keeper retaining member 40, as depicted in FIGS. 1-5. Lock nut system 10 may engage a shaft (not shown). In particular, threads 50 of nut 20 may engage threads of the shaft (not shown). Keeper 30 and keeper retaining member 40 may engage nut 40 and keeper 30 may engage the shaft to inhibit movement of the shaft relative to nut 20.

Nut 20 may include a plurality of engaging teeth 120 extending circumferentially around an inner radial surface of nut 20. For example, nut 20 may include 60 engaging teeth. Nut 20 may also include a shoulder 24 configured to receive keeper 30. For example, shoulder 24 may be spaced from an outer surface 22 of nut 20 in an axial direction relative to nut 20 such that an axial dimension of keeper 30 relative to nut 20 is received between outer surface 22 and shoulder 24. Shoulder 24 may also abut and support keeper 30 in an axial direction. Nut 20 may be molded or formed of powdered metal, for example.

Nut 20 may include a slot 60 extending circumferentially (e.g., completely or partially) around nut 20. Slot 60 may be located between engaging teeth 120 and outer surface 22 of nut 20. Also, slot 60 may have a radial depth of about 0.050 inches. Keeper retaining member 40 may engage slot 60. For example, a first leg 42 and a second leg 43 may be received in slot 60. Further, a nose 44 of retaining member 40 may be received in slot 60.

Figure 4:
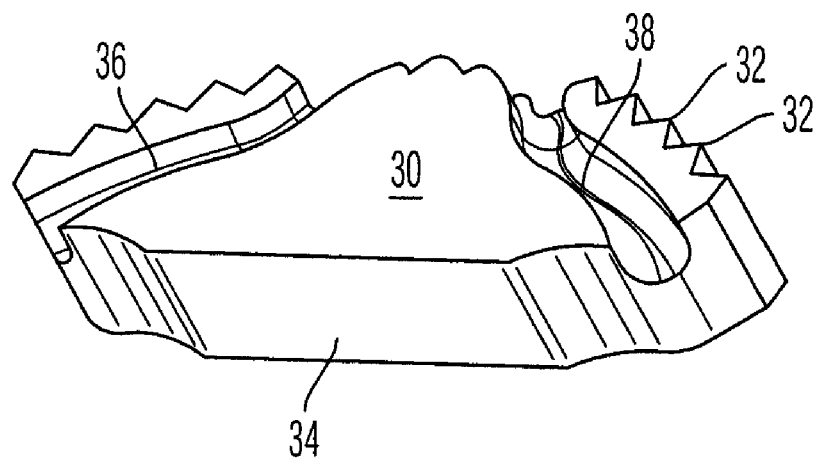
FIG. 4 is a perspective view of the keeper of FIG. 1.
Figure 5:
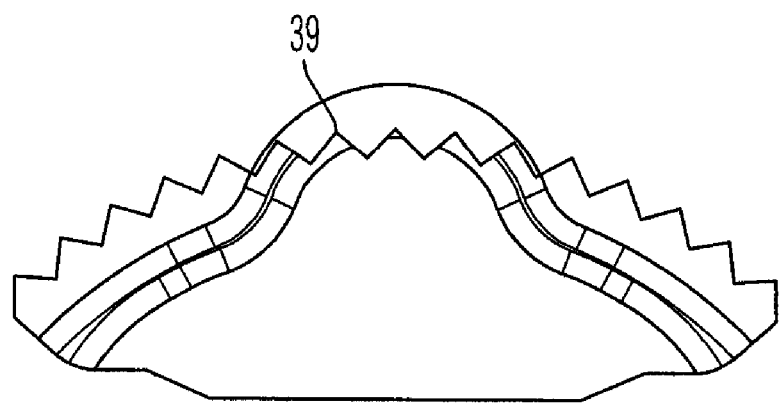
FIG. 5 is a top elevational view of the keeper of FIG. 1.

Keeper 30 may include a plurality of keeper teeth 32 configured to engage engaging teeth 120 of nut 20 such that movement between keeper 30 and nut 20 is inhibited when keeper teeth 32 and engaging teeth 120 are engaged to each other. Keeper 30 may include a shaft engaging side 33 configured (e.g., shaped and dimensioned) to engage a shaft (not shown) to inhibit movement (e.g., rotational movement) of the shaft relative to keeper 30, when threads 50 of nut 20 engage threads (not shown) of the shaft, keeper teeth 32 engage engaging teeth 120, and keeper retaining member 40 engages slot 60. For example, the engagement or meshing of keeper teeth 32 and engaging teeth 120 inhibits movement of keeper 30 relative to nut 20 and the engagement of engaging side 33 with the shaft inhibits movement between keeper 30 and the shaft thereby inhibiting movement between nut 20 and the shaft. As depicted in FIGS. 1 and 4-5, keeper 30 may include 15 keeper teeth 32 evenly spaced from one another, for example. Also, keeper teeth 30 on outer circumferential sides 35 of keeper 30 may have an axial height (i.e., relative to nut 20) substantially equal to a distance from shoulder 24 to outer surface 22. Keeper teeth 32 on an inner portion 39 of keeper 30 may have a height substantially equal to a distance from shoulder 24 to slot 60 thereby allowing nose 44 of retaining member 40 to extend into slot 60. More specifically, keeper teeth 32 on an inner portion 39 have an axial height less than keeper teeth 32 on outer sides 35. The reduced axial height on inner portion 39 allow nose 44 to pass over teeth 32 to extend into slot 60.

Keeper 30 may include a first keeper cavity 36 and a second keeper cavity 38 configured (e.g., shaped and dimensioned) to receive keeper retaining member 40 as depicted in FIGS. 1 and 4-5. For example, a bottom side of each of cavity 36 and cavity 38 may be axially spaced from an outer surface 22 of nut 20 such that keeper retaining member 40 abuts the bottom side of such cavities when received in slot 60 and retaining member 40 is received in a plane formed by outer surface 22 and slot 60 and cavities 36 and 38. Also, as depicted in FIG. 1, cavity 36 and cavity 38 may receive about 20 percent of a linear dimension of retaining member 40. In unillustrated examples, cavity 36 and cavity 38 along with keeper 30 could be larger such that more of retaining member 40 is received therein. In a further unillustrated embodiment, keeper 30 could extend partially or entirely circumferentially around nut 20 (e.g., abutting shoulder 24) and could include keeper teeth 32 around an entire outer circumference of keeper 30, which therefore could engage some or all of engaging teeth 120.

Retaining member 40 may be elastically deformable to allow it to be received in slot 60. For example, first leg 42 and second leg 43 may be deformed (e.g., in a direction substantially perpendicular to the axis of nut 20) toward one another prior to being inserted axially past outer surface 22 of nut 20 to allow retaining member 40, and keeper 30 to be attached thereto. First leg 42 and second leg 43 may then be elastically returned toward slot 60. For example, retaining member 40 may be formed of ASTM A228 spring steel and may be 0.093 round wire as will be understood by those skilled in the art. Also, retaining member 40 may be cylindrical as depicted in FIG. 1. Alternatively, retaining member 40 could be formed of other materials and/or formed in other shapes to allow retaining member 40 to received in slot 60 and/or cavities (e.g. cavity 36 and cavity 38) of keeper 30.

Further, Keeper 30 may be formed or molded of powdered metal, for example. Also, keeper 30 could be formed in different shapes to allow it to engage a shaft to thereby inhibit movement of such shaft. Further, a keeper (e.g., keeper 30) may be formed of a shape such that a retainer (e.g., retaining member 40) is not necessary. For example, a keeper could be completely or partially rounded such that keeper teeth 32 engage more (or all) of engaging teeth 120 than depicted in the figures.

Retaining member 40 when received in slot 60, in first cavity 36 and second cavity 38 may align keeper 30 such that keeper teeth 32 are engaged with engaging teeth 120. Further, retaining member 40 provides resistance in an axial direction relative to nut 20 thereby inhibiting movement of keeper 30 axially away from shoulder 24 toward outer surface 22. Also, the sides of cavities 34 and 36 of keeper 30 may be coined, crimped, or otherwise manipulated such that retaining member 40 received in cavities 34 and 36 remains connected to keeper 30. Alternatively, keeper 30 and retaining member 40 could be formed integral to one another.

Figure 6:
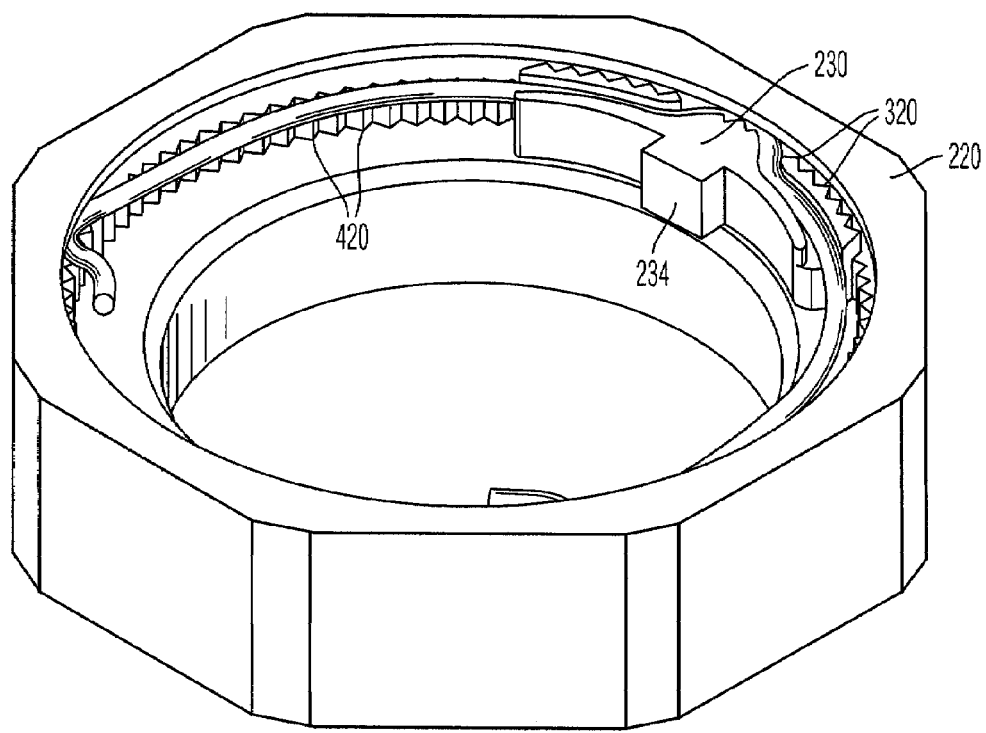
FIG. 6 is a perspective view of another embodiment of a lock nut system having a lock nut engaged with a keeper and a keeper retaining member.

In an alternate embodiment depicted in FIG. 6, a lock nut system 200 includes a keeper 230 having keeper teeth 320 which are configured to engage engaging teeth 420 of a nut 220. Keeper 230 may also include an engaging member 234 which protrudes radially inwardly relative to nut 20 to engage a slot (not shown) of a shaft. Thus, engaging member 234 may inhibit movement of keeper 230 relative to the shaft (not shown) and the engagement of engaging teeth 420 with keeper teeth 320 may inhibit movement of keeper 230 relative to nut 220. Accordingly, movement of nut 220 relative to the shaft (not shown) is prevented or reduced. Nut 220 and keeper 230 may be molded or formed of powdered metal, for example. Such a shaft may be found on the rear axle of a vehicle, for example. In contrast, keeper 30 described above may engage a shaft slot (not shown) of a front axle of such a vehicle, for example.

Figure 7:
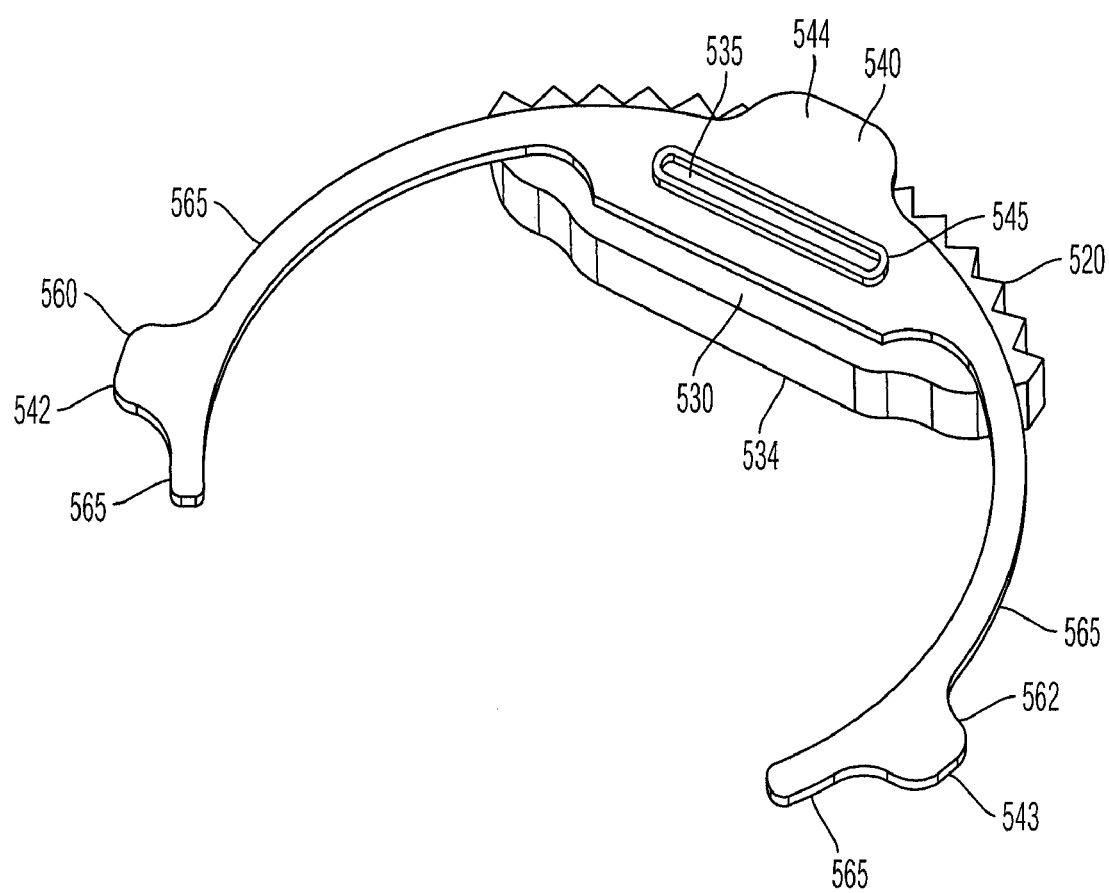
FIG. 7 is a perspective view of another embodiment of a keeper connected to a keeper retaining member in accordance with the present invention.
Figure 8:
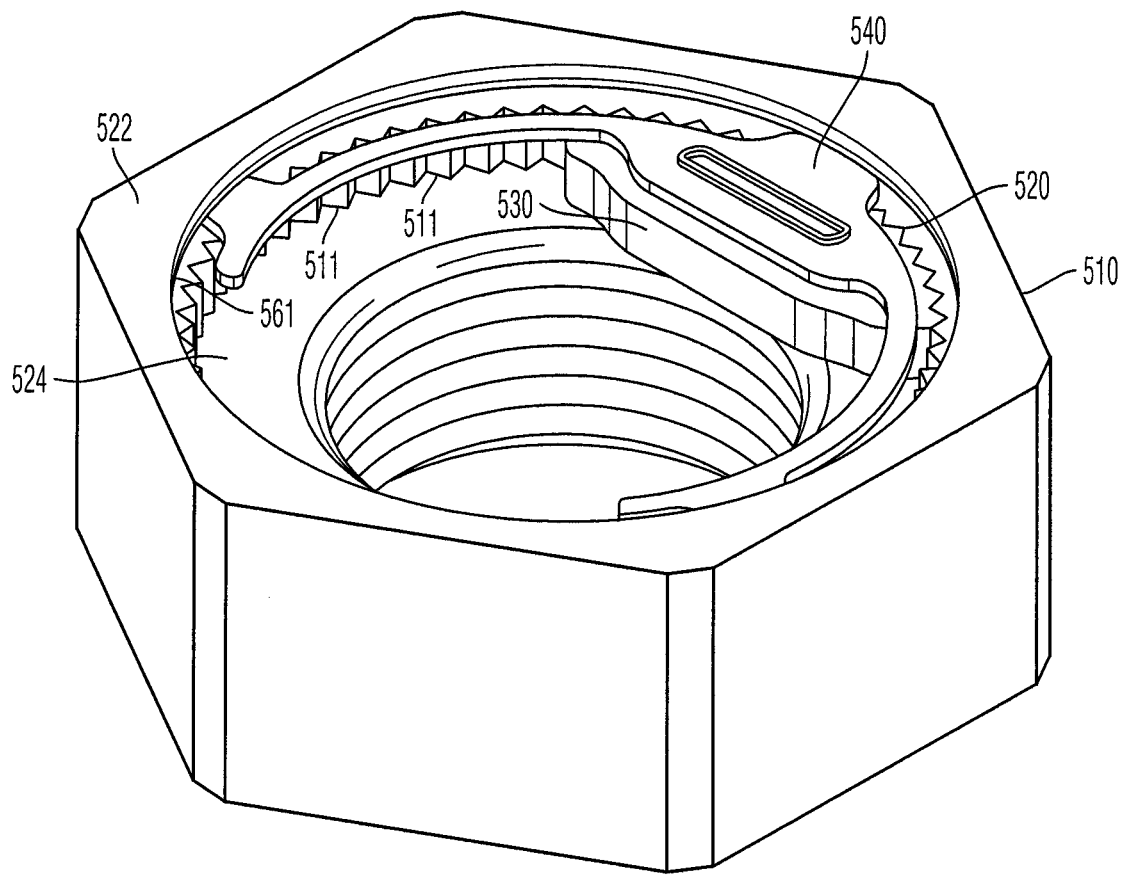
FIG. 8 is a perspective view of a lock nut system which includes the keeper connected to the keeper retaining member of FIG. 7, which are engaged with a nut.
Figure 9:
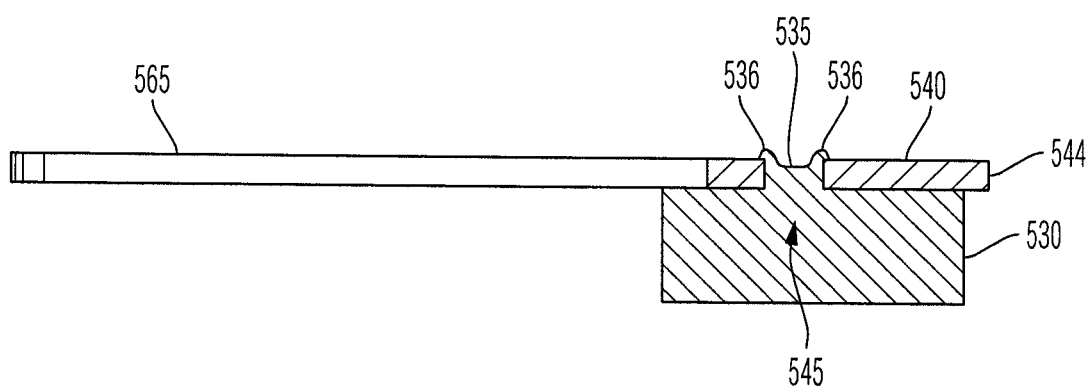
FIG. 9 is a side cross sectional view of the keeper connected to the keeper retaining member of FIG. 7.

In a further embodiment depicted in FIGS. 7-9, a keeper 530 is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. For example as best depicted in FIG. 8, the deformation of projection 535 may cause edges 536 of projection 535 to extend over a top surface of keeper 530 thereby connecting projection 535 and keeper 530 to retaining member 540.

Keeper 530 and retaining member 540 engage a nut 510 similar to that described above for nut 20, keeper 30, and retaining member 40. For example, keeper 530 includes keeper teeth 520 which are configured to engage engaging teeth 511 of nut 510. Keeper 530 may also include an engaging member 534 which protrudes radially inwardly relative to nut 20 to engage a slot, groove or other engaging portion (not shown) of a shaft. Thus, engaging member 534 may inhibit movement of keeper 530 relative to the shaft (not shown) and the engagement of engaging teeth 511 with keeper teeth 520 may inhibit movement of keeper 530 relative to nut 510. Accordingly, movement of nut 510 relative to the shaft (not shown) is prevented or reduced. Keeper 530 may be molded or formed of powdered metal, for example.

Keeper retaining member 540 may engage a slot 561 similar to keeper retaining member 40 engaging slot 60 as described above. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to nut 510 thereby inhibiting movement of keeper 530 axially away from a shoulder 524 toward an outer surface 522.

As described above for retaining member 40, retaining member 540 may be elastically deformable to allow it to be received in slot 561. For example, first leg 542 and second leg 543 may be deformed (e.g., in a direction substantially perpendicular to the axis of nut 510) toward one another prior to being inserted axially past outer surface 522 of nut 510 to allow retaining member 540, and keeper 530 to be attached thereto. First leg 542 and second leg 543 may then be elastically returned toward slot 561. Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to received in slot 561 and to be connected to keeper 540 via projection 535. Further, as described above for keeper 30, keeper 530 may be formed or molded of powdered metal, for example. Alternatively, keeper 530 and retaining member 540 could be formed integral to one another.

Also, the relative axial thicknesses of keeper 530 relative to keeper 30 may differ. In particular, an axial thickness of keeper 530 may extend to about the same axial thickness as engaging teeth 511 or 120. In contrast, keeper 30 extends from shoulder 24 to outer surface 22 in the embodiment depicted in FIG. 1. Alternatively in an unillustrated embodiment, keeper 30 could axially extend only the thickness of engaging teeth 120, and keeper teeth 520 could extend a distance equivalent to the distance from shoulder 24 to outer surface 22 except for any keeper teeth of keeper teeth 520 located in the radial vicinity of nose 544 which would be as thick as engaging teeth 511 or 120.

Figure 10:
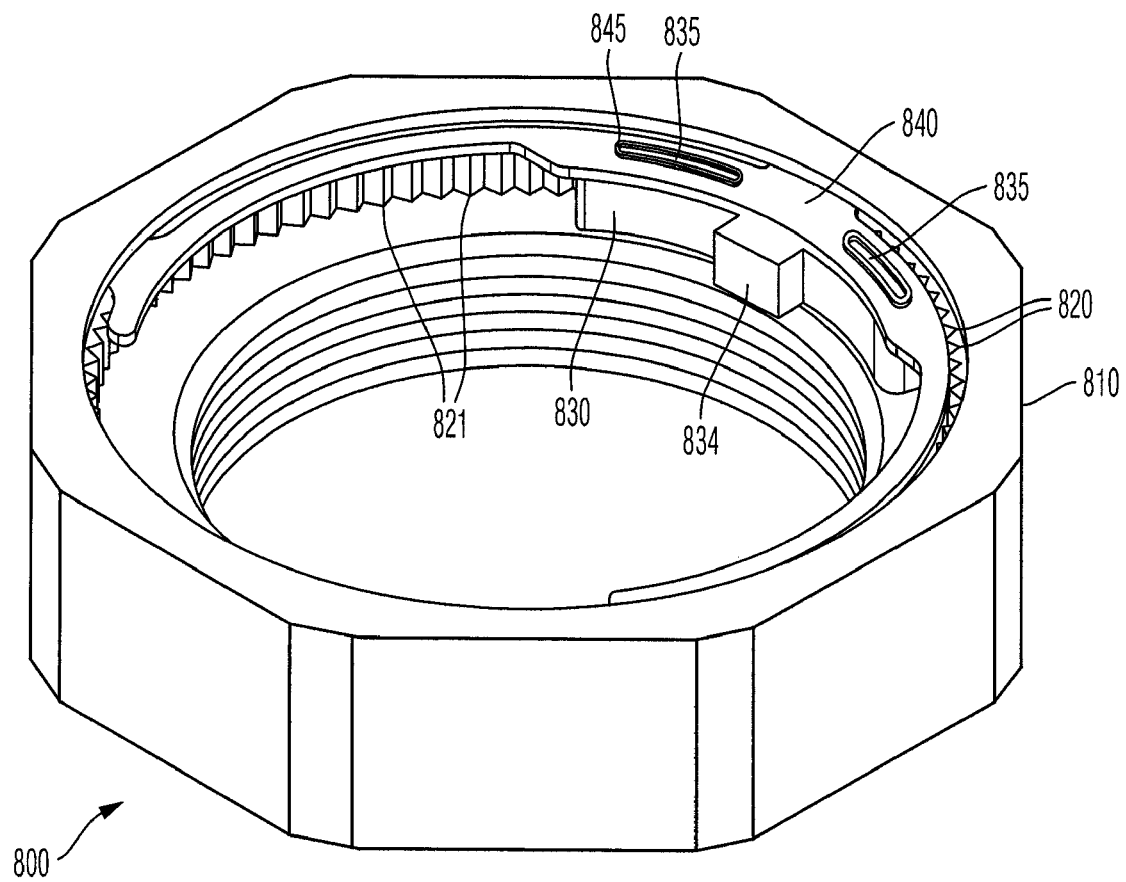
FIG. 10 is a perspective view of a lock nut system which includes a keeper connected to a keeper retaining member, which are engaged with a nut.

In another embodiment depicted in FIG. 10, a lock nut system 800 includes a keeper 830 having keeper teeth 820 which are configured to engage engaging teeth 821 of a nut 810. Keeper 830 is connected to a keeper retaining member 840. One or more projections 835 of keeper 830 extends through an opening 845 in retaining member 840 when connected. Projections 835 extend substantially perpendicular to a plane of retaining member 840. Projections 835 may be deformed by pressure applied on a top thereof (i.e. in a direction substantially perpendicular to the plane of retaining member 840) to connect retaining member 840 with keeper 830 similar to keeper 530 and retaining member 540 described above. Keeper 830 may also include an engaging member 834 which protrudes radially inwardly relative to nut 810 to engage a slot (not shown) of a shaft. Thus, engaging member 834 may inhibit movement of keeper 830 relative to the shaft (not shown) and the engagement of engaging teeth 821 with keeper teeth 820 may inhibit movement of keeper 830 relative to nut 810. Accordingly, movement of nut 810 relative to the shaft (not shown) is prevented or reduced. Nut 810 and keeper 830 may be molded or formed of powdered metal, for example. Such a shaft may be found on the rear axle of a vehicle, for example. In contrast, keeper 530 described above may engage a shaft slot (not shown) of a front axle of such a vehicle, for example.

Figure 11:
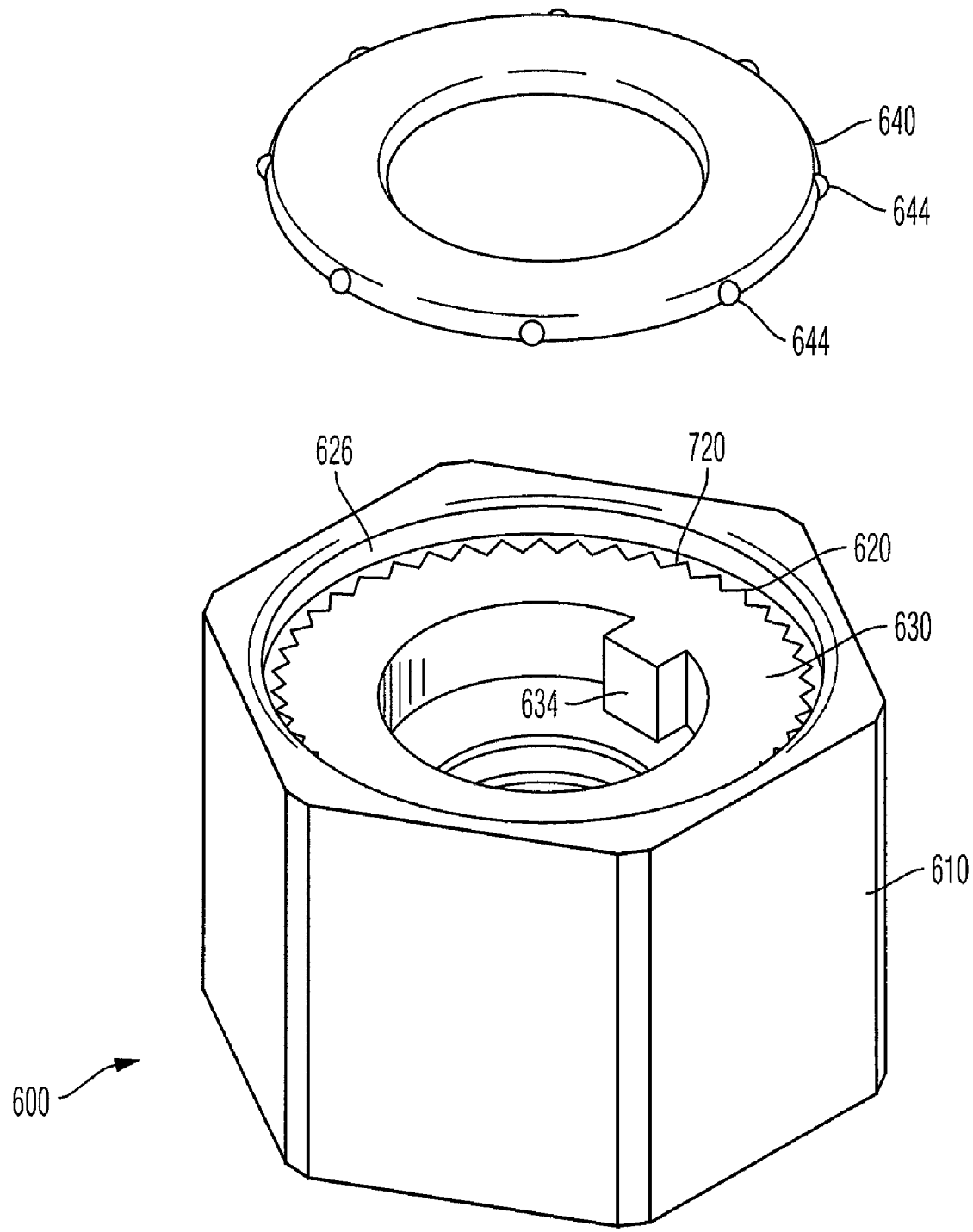
FIG. 11 is a perspective exploded view of another embodiment of a lock nut system which includes a keeper engaged with a nut and a keeper retaining member shown separated from the nut.

In yet a further embodiment depicted in FIGS. 11-13, a lock nut system 600 may include a nut 610, a keeper 630, and a retaining member 640. Nut 610 may include a plurality of engaging teeth 720 while keeper 620 may include a plurality of keeper teeth 630. Keeper 630 may be round such that a circumference of engaging teeth 720 engage a circumference of keeper teeth 620 to inhibit movement of nut 610 relative to a shaft (not shown) as described above for the other systems. An engaging member 634 is configured to engage a slot or groove of the shaft similar to engaging member 234 described above.

Retaining member 640 is also substantially circular, made of a highly elastic material, and includes a plurality of radial projections 644 which engage an annular shoulder or rim 626. Radial projections 644 and/or retaining member 640 may elastically deform (e.g., radially inwardly) to provide a friction fit of retaining member 640 relative to nut 610 thereby axially holding keeper 630 toward nut 610 and such that engaging teeth 720 engage keeper teeth 620. For example, radial projections 644 may elastically deform radially inwardly, and they may at least partially elastically return to provide the frictional fit. In an un-illustrated embodiment, nut 610 may include an annular slot located on rim 626 which receives projections 644 of retaining member 640 when projections 644 engage rim 626. Such a slot may have a radial depth of about 0.003 inches, for example. Nut 610 and keeper 630 may be molded metal (e.g., formed of powdered metal) while retaining member 640 may be formed of a plastic material. Alternatively, nut 610, keeper 630, and/or retaining member 640 may be formed of a plastic material (e.g., injection molded plastic).

Use of molded metals (e.g., powdered metal) as described above for the nuts and keepers allows a finer spacing of teeth than other materials (e.g., sheet metal keepers) and methods thereby allowing finer adjustment of nuts, keepers, and shafts relative to each other, while preventing or inhibiting movement of the keeper relative to the nuts. For example, the use of powdered metal instead of stamped sheet metal for a keeper allows a higher number of keeper teeth to be provided per unit area thereby allowing more engagement with corresponding engagement teeth on the nut. The ability of the molded teeth in the present invention to resist torque is significantly higher that that afforded by a stamped part of previous inventions because of the ability to economically mold teeth with greater axial dimensions as well as the ability to include a greater number of engaging teeth per unit area, when using powdered metal instead of stamped sheet metal. A finer adjustment may be therefore be provided of the keeper relative to the nut due to such increased number of keeper teeth and corresponding increased number of engaging teeth of a nut per unit area. For example, a finer adjustment of bearing clearance can be achieved with the use of the finer pitch of the molded teeth. Further, the use of molded metals (e.g., powdered metals) for keeper 30 allows engaging side 33 to engage a shaft without being significantly deformed or significantly deforming the shaft in contrast to other materials used for this purpose (e.g., stamped sheet metal) which may deform after a period in use or cause deformation (e.g., stripped threads) of a shaft to which it is engaged. Additionally, such a molded keeper may be harder and stronger than a stamped sheet metal keeper thereby inhibiting such damage Thus, a higher torque loading may be provided utilizing molded metals (e.g., powdered metal) relative to other materials (e.g., a sheet metal stamped keeper) to form keepers and nuts and without resulting in failure, i.e., a risk of damage to the shaft or axle due to over torque is minimized. Also, engaging members (e.g., engaging member 234) of keepers may resist deformation when engaged with a slot of a shaft for the same reasons.

Although the above-described nuts (e.g., nut 20, nut 220, nut 510 and nut 810) and keepers (e.g., keeper 30, keeper 230, keeper 530, keeper 830, and keeper 630) are described as being molded or formed of powdered metal, these nuts and keepers could be die cast, molded of other materials, or formed in any other manner which would allow the teeth of the keeper and nut to inhibit movement relative to each other along with the keeper and shaft inhibiting movement relative to one another. Also, retaining members (e.g., retaining member 40, retaining member 540, retaining member 840 and retaining member 640) could be formed of the same materials as the keepers and/or nuts. Such retaining members could also be formed of plastic or any other material which would axially hold a keeper (e.g., keeper 30) such that the keeper teeth thereof (e.g., keeper teeth 32) are engaged with engaging teeth (e.g., engaging teeth 120) of a nut (e.g., nut 20). For example, such retaining members could be formed of plastics which satisfy this criteria.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A lock nut system comprising:
   a nut having a plurality of engaging teeth;
   a keeper having a plurality of keeper teeth engageable with said plurality of engaging teeth of said nut to inhibit movement of said keeper relative to said nut when said plurality of engaging teeth engages said plurality of keeper teeth;
   said keeper having a radially inner side configured to engage a shaft to inhibit rotational movement of said nut relative to the shaft when said plurality of engaging teeth engages said plurality of keeper teeth and said radially inner side engages the shaft; and
   a separate keeper retaining member secured to said keeper, said retaining member engageable with said nut to hold said keeper axially such that said plurality of keeper teeth are engaged with said plurality of engaging teeth, said retaining member extending continuously in an arc from a first outside end to a second outside end, said keeper located between said first end and said second end.

2. The system of claim 1 wherein said inner side of said keeper comprises a shaft engaging member engageable in a shaft slot of the shaft to inhibit rotational movement of said nut relative to the shaft.

3. The system of claim 1 wherein said nut farther comprises a slot and said keeper retaining member comprises at least one leg configured to be received in said slot.

4. The system of claim 3 wherein said keeper retaining member is configured to hold said keeper axially relative to said nut such that said plurality of engaging teeth and said plurality of keeper teeth are engaged when said at least one leg is received in said slot.

5. The system of claim 3 wherein said at least one leg comprises two legs elastically deformable toward one another to allow said retaining member to be attached to said nut by inserting said two legs in said slot.

6. The system of claim 1 wherein said keeper comprises a keeper cavity configured to receive a keeper retaining member.

7. The system of claim 6 wherein said keeper retaining member comprises a nose portion, said keeper retaining member is received in said keeper cavity and said nose portion extends from said keeper cavity into a slot of said nut.

8. The system of claim 1 wherein said keeper retaining member extends through a first keeper cavity of said keeper, extends into said slot, and extends into a second keeper cavity of said keeper.

9. The system of claim 1 wherein said nut comprises a shoulder portion and said keeper is received on said shoulder portion such that said keeper is axially supported by said shoulder portion.

10. The system of claim 1 wherein said keeper comprises an axially projecting portion and said retaining member comprises a receiving opening, said projecting portion being received in said receiving opening to connect said keeper to said keeper retaining member.

11. The system of claim 1 wherein said retaining member is formed of a material different than said nut and said keeper, such that said retaining member is more flexible than said keeper and said nut.

12. The system of claim 1 wherein said plurality of keeper teeth engages all of said engaging teeth.

13. The system of claim 12 wherein said keeper retaining member comprises a disk having a plurality of projections for frictionally engaging said disk with said nut to retain said keeper such that said keeper teeth are engaged with said engaging teeth.

14. A lock nut system comprising:
    a nut having a plurality of engaging teeth and a slot;
    a keeper having a plurality of keeper teeth engageable with said plurality of engaging teeth to inhibit movement of said keeper relative to said nut when said plurality of engaging teeth engages said plurality of keeper teeth, said keeper avoiding extending into said slot;

a keeper retaining member connected to said keeper and said keeper retaining member comprising at least one leg configured to be received in said slot;

said keeper retaining member configured to hold said keeper axially such that said plurality of teeth and said plurality of keeper teeth are engaged when said at least one leg is received in said slot; and said keeper having a radially inner side configured to engage a shaft to inhibit rotational movement of said nut relative to the shaft when said plurality of teeth engages said plurality of keeper teeth and said radially inner side engages the shaft.

15. The system of claim 14 wherein said inner side of said keeper comprises a shaft engaging member engageable in a shaft slot of the shaft to inhibit rotational movement of said nut relative to the shaft.

16. The system of claim 14 wherein said at least one leg comprises two legs elastically deformable toward one another to allow said retaining member to be attached to said nut by inserting said two legs in said slot.

17. The system of claim 14 wherein said keeper comprises a keeper cavity and said keeper retaining member is received in said keeper cavity to connect said keeper to said keeper retaining member.

18. The system of claim 17 wherein said keeper retaining member comprises a nose portion, said nose portion extending from said keeper cavity into said slot.

19. The system of claim 18 wherein said keeper retaining member extends through said keeper cavity, extends into said slot, and extends into a second keeper cavity.

20. The system of claim 14 wherein said keeper comprises a projecting portion and said keeper retaining member comprises a receiving opening, said projecting portion being received in said receiving opening to connect said keeper to said keeper retaining member.

21. The system of claim 14 wherein said nut comprises a shoulder portion and said keeper is received on said shoulder portion such that said keeper is axially supported by said shoulder portion.

22. The system of claim 14 wherein said keeper teeth comprise an arc having a first outer end and a second outer end, said keeper teeth extending from said first end to said second end, said retaining member located axially between said keeper and said outer surface.

23. A lock nut system comprising:

a nut having a plurality of engaging teeth, an outer surface axially closest to said plurality of engaging teeth, and a shoulder;

a keeper having a plurality of keeper teeth engaging said plurality of engaging teeth to inhibit movement of said keeper relative to said nut, said plurality of keeper teeth comprising an arc having a first outer end and a second outer end, said keeper teeth extending from said first end to said second end;

said shoulder being substantially orthogonal to an axis of said nut, said shoulder abutting and axially supporting said keeper;

said keeper having a radially inner side configured to engage a shaft to inhibit rotational movement of said nut relative to the shaft when said plurality of engaging teeth engages said plurality of keeper teeth and said radially inner side engages the shaft; and a keeper retaining member engaged with said keeper and engageable with said nut to hold said keeper axially such that such plurality of keeper teeth are engaged with said plurality of engaging teeth, said retaining member located axially between said keeper and said outer surface.

24. The system of claim 23 wherein said nut further comprises a circumferential rim, said keeper retaining member located at an axial center of said outer surface and engaging said rim, said keeper retaining member holding said keeper axially such that said plurality of engaging teeth and said plurality of keeper teeth are engaged and such that said keeper abuts said shoulder.

25. The system of claim 23 wherein said plurality of keeper teeth engages all of said engaging teeth.

* * * * *